United States Patent [19]

Burshaw et al.

[11] Patent Number: 5,497,570
[45] Date of Patent: Mar. 12, 1996

[54] FITTED IRONING BOARD COVERS WITH PLEATS

[75] Inventors: Ron Burshaw, Hamilton; Hugh Thompson; Geoff Brownrigg, both of Cambridge, all of Canada

[73] Assignee: The Cambridge Towel Corporation, Cambridge, Canada

[21] Appl. No.: 272,085

[22] Filed: Jul. 8, 1994

[51] Int. Cl.⁶ .............................. D06F 83/00; F16G 11/00
[52] U.S. Cl. .............................................. 38/140; 24/115 G
[58] Field of Search ....................... 38/140, 66; 24/115 G

[56]          References Cited

U.S. PATENT DOCUMENTS

| | | | |
|---|---|---|---|
| 457,033 | 8/1891 | Sanders | 38/140 |
| 1,149,467 | 8/1915 | Rochau | 38/140 |
| 1,177,572 | 3/1916 | Palmer | 38/140 |
| 1,196,262 | 8/1916 | Melton | 38/140 |
| 1,287,597 | 12/1918 | Murray | 38/140 |
| 1,403,088 | 1/1922 | Lefkovits | 38/140 |
| 1,832,545 | 11/1931 | Grant | 38/140 |
| 1,885,737 | 11/1932 | Lewis | 38/140 |
| 2,031,595 | 2/1936 | Finck | 38/140 |
| 2,264,644 | 12/1941 | Santangelo | 38/140 |
| 2,269,804 | 1/1942 | Allaback | 38/140 |
| 2,278,517 | 4/1942 | John | 38/140 |
| 2,418,969 | 4/1947 | Di Gesare | 38/140 |
| 2,850,817 | 9/1958 | Rudd et al. | 38/140 |
| 2,850,817 | 9/1958 | Rudd et al. | 38/140 |
| 3,007,267 | 11/1961 | Goldsmith | 38/140 |
| 3,733,724 | 5/1973 | Davis | 38/140 |
| 3,911,603 | 10/1975 | Lehrman | 38/140 |
| 4,453,292 | 6/1984 | Bakker | 24/115 G |
| 4,557,062 | 12/1985 | Mattesky | 38/140 |
| 4,621,003 | 11/1986 | O'Kane | 38/140 |
| 4,675,948 | 6/1987 | Bengtsson | 24/115 G |
| 4,813,166 | 3/1989 | Drake | 38/140 |
| 5,231,777 | 8/1993 | Mattesky et al. | 38/140 |

FOREIGN PATENT DOCUMENTS

| | | | |
|---|---|---|---|
| 1255205 | 6/1989 | Canada . | |
| 8200942 | 10/1983 | Netherlands | 38/140 |

*Primary Examiner*—C. D. Crowder
*Assistant Examiner*—Ismael Izaguirre
*Attorney, Agent, or Firm*—Neil H. Hughes; Ivor M. Hughes

[57]            ABSTRACT

An ironing board cover having a front, a rear, two sides, a top and a bottom. The cover includes a top sheet, a sewn in flexible pad, a nose segment near the front of the cover, a heel segment near the rear of the cover, and two side segments. All the segments are attached to one another at seams, and the flexible pad is sewn into the bottom of the top sheet only about the circumference of the top sheet. The nose segment, side segment and heel segment are cut from a pattern so as to provide when joined with the top sheet a form fit ironing board cover. The heel segment and/or the nose segment include a box pleat to allow for the give of the heel and/or the nose segment when installing the ironing board cover on an ironing board. The box pleat in combination with the engineered segments providing for a tight yet flexible fit of the ironing board cover on the ironing board thereby providing a user with a non-stick and flexible surface upon which to iron.

15 Claims, 4 Drawing Sheets

FITTED IRONING BOARD COVERS WITH PLEATS

FIELD OF THE INVENTION

This invention relates to Ironing Board Covers and specifically provides an Ironing Board Cover engineered to fit an Ironing Board securely so as to improve, the installation of the cover on the Ironing Board, and the use of the Ironing Board by the user.

BACKGROUND OF THE INVENTION

There exists within the prior art a number of covers for Ironing Boards. One such cover is a loosely fitted sheet like material having a draw string provided which allows the user to pull the edges of the cover underneath the Ironing Board and toward one another. Typically the draw string is then tied underneath the Ironing Board and normally underneath the heel of the board which is the typical location of the draw string. However to provide a draw string at the nose of the cover within an arcuate binding path at that location is heretofore unknown.

It is also known within the prior art to provide an underpad with the cover. In fact U.S. Pat. No. 4,557,062 provides an Ironing Board Cover which is designed so as to include an underpad sewn into the cover at the nose and heel of the cover. The Ironing Board Cover is also form fitted, and provided with a pleat adjacent the heel of the cover so as to provide a better fitting of the cover on the board. However the pleat is not a box pleat which lies flat and does not fan out, the box pleat providing a more precise fit of the Ironing Board Cover on the Ironing Board.

Nowhere in the prior art is there provided an Ironing Board Cover with an integral foam backing pad and fiber pad sewn into the cover which provides a precise fit over the Ironing Board before tightening of the draw string so as to provide a firm yet flexible surface upon which a user may do their ironing.

It is therefore an object of this invention to provide an Ironing Board Cover which is engineered to provide the user with a maximum ease of installation on an Ironing Board and ease of use when Ironing.

It is a further object of this invention to provide an Ironing Board Cover which includes a box pleat adjacent the heel, and/or the nose of the Ironing Board so as to provide an easy fit of the cover over the Ironing Board, and which may be conveniently fastened so as to provide a smoother drawing of the fabric underneath the Ironing Board without excessive bunching.

Further and other objects of this invention will become apparent to those skilled in the art when considering the following summary of the invention and the more detailed description of the preferred embodiments illustrated herein.

SUMMARY OF THE INVENTION

According to a primary aspect of the invention there is provided an Ironing Board Cover comprising a front, a rear, two sides, a top and a bottom, preferably said cover being coated with a clear non-stick material such as Teflon, a Trade Mark of E. I. du Pont de Nemours and Company, a fluorine containing polymers in resins in dispersion form such as polytetrafluoroethylene ((C2F4)n) so as to provide a surface more readily acceptable to the user for ironing purposes, said cover including a top sheet, a sewn in flexible pad, a nose segment adjacent the front of the cover, a heel segment adjacent the rear of the cover, and two side segments, said segments being attached to one another at seams, and said flexible pad being sewn into the bottom of the top sheet about the circumference of the top sheet; preferably said flexible pad including an inner foam pad and an outer fiber pad, said nose segment, side segment and heel segment being tapered when formed so as to provide when joined with the top sheet and the preferred flexible pad a form fit Ironing Board Cover, (preferably the side segments, and preferably the nose and heel segments being formed as arcuate segments to provide when assembled a form fit skirt with the top sheet before tightening a draw string), said heel segment and/or said nose segment including a box pleat for allowing the give of either the heel or the nose segment or both when installing the Ironing Board Cover on an Ironing Board, preferably said side segments, said heel segment with said box pleat, and said nose segment including a path way or binding for a draw string integral therewith when assembled, said preferred draw string terminating at two ends adjacent the nose portion of the Ironing Board Cover, preferably said nose segment including an arc portion adjacent the binding where the draw string is located to provide a smoother tensioning of the draw string, preferably said draw string having a quick locking device including a spring biased detent means which presses against the draw string when said draw sting is pulled to tighten said Ironing Board Cover on said Ironing Board, preferably the spring biased detent means allows the draw string to pass through the locking device and thereafter when released pinches the draw string at an infinite number of positions thus allowing tightening of the draw string and securing of said Ironing Board Cover on an Ironing Board, wherein said box pleat said engineered segments and said draw string provide for a tight yet flexible fit of the Ironing Board Cover on the Ironing Board and provides a user with a non-stick and flexible surface upon which to iron.

DETAILED DESCRIPTION OF THE PREFERRED EMBODIMENTS

Figure 1:
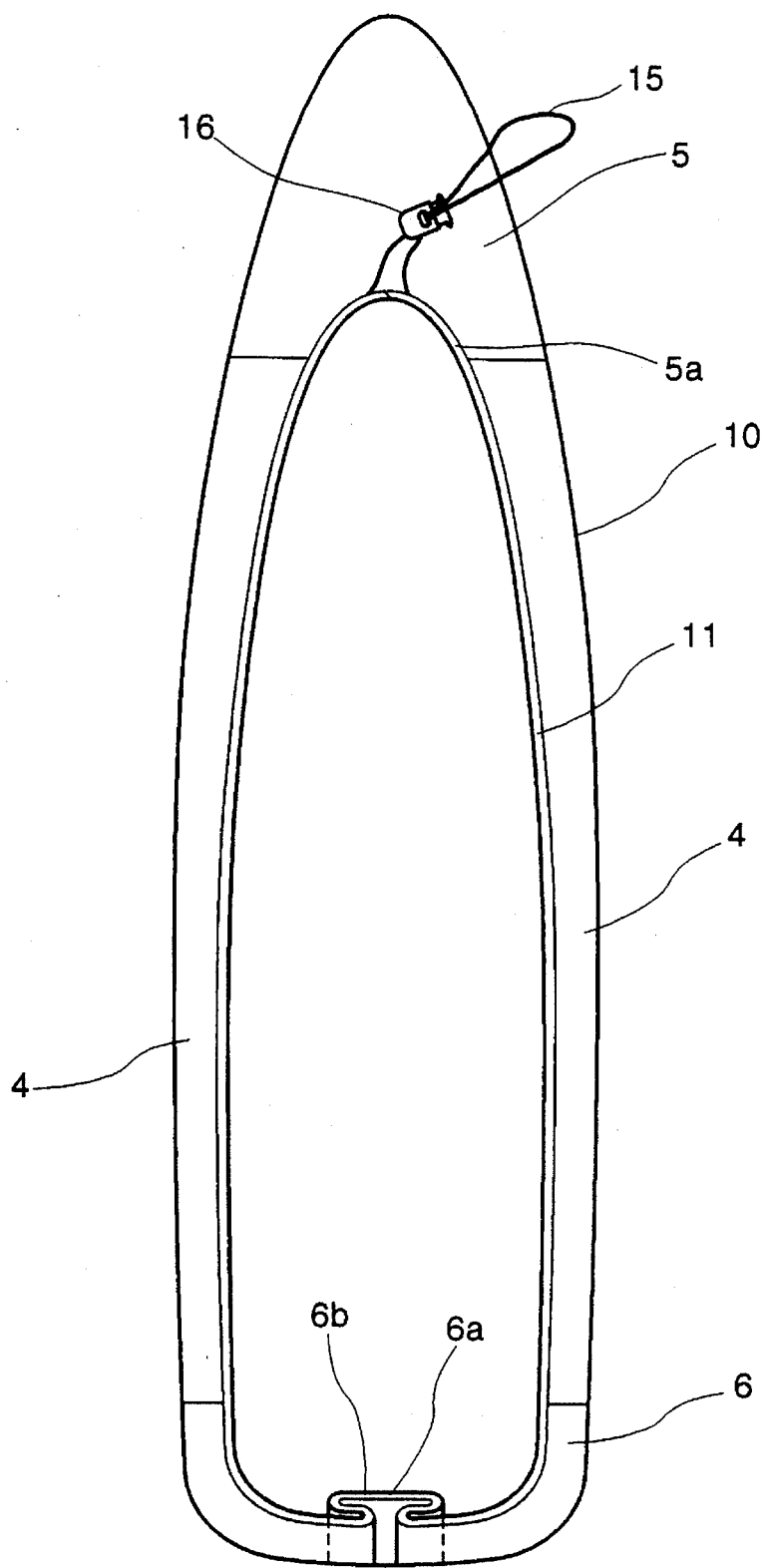
FIG. 1 and FIG. 1A are bottom views of the Ironing Board Cover illustrated in a preferred and alternative embodiment of the invention.
Figure 1A:
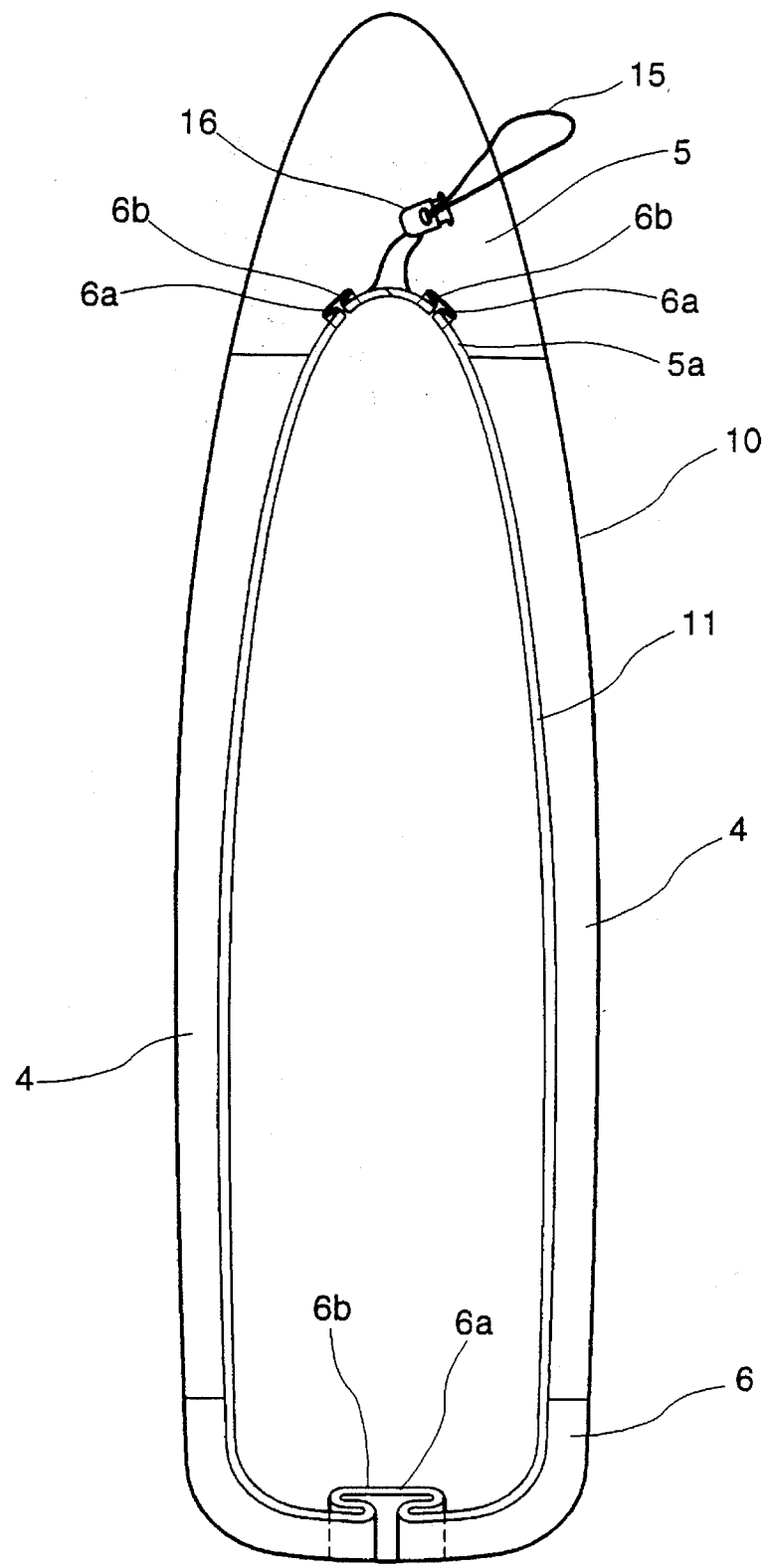
Figure 3:
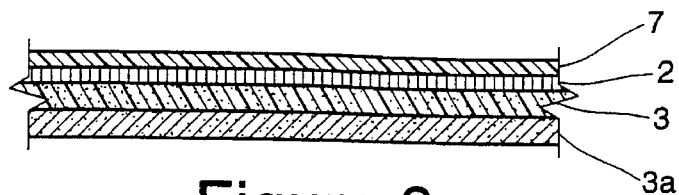
FIG. 3 is a cross sectional view of the top of the Ironing Board Cover illustrated in a preferred embodiment of the invention.
Figure 4:
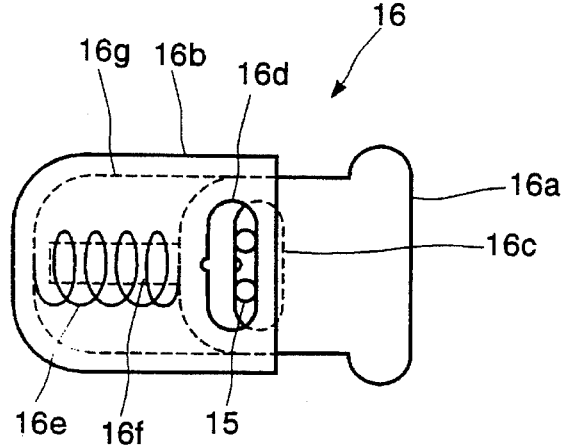
FIG. 4 is a close up view of the locking mechanism for the draw string illustrated in a preferred embodiment of the invention.
Figure 2:
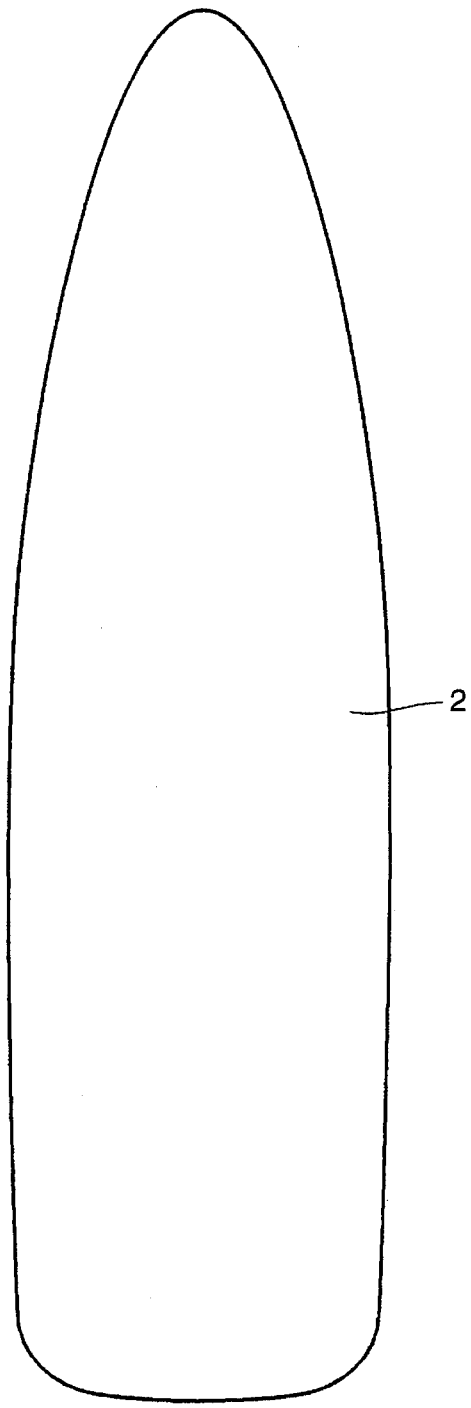
FIG. 2 is a top view of the Ironing Board Cover illustrated in a preferred embodiment of the invention.

Referring generally to the figures there is illustrated a Ironing Board Cover (10) for covering an Ironing Board. The Ironing Board Cover is manufactured from a top sheet (2) a middle foam pad (3) a fiber filled bottom (3a) a pair of side segments 4, and a nose and a heel segment (5) and (6). The heel segment (6) or alternatively as is seen in FIG. 1A the nose segment, includes a box pleat (6a) with a binding portion (6b) integral therewith which provides for easy installation of the Ironing Board Cover on an Ironing Board. Each of the segments (2), (4), (5), and (6) are covered with a non-stick coating (7) such as Teflon, a fluorine containing polymers in resins in dispersion form such as polytetrafluoroethylene ((C2F4)n), (a Trade Mark of E. I. du Pont de Nemours and Company), impregnated cotton so as to allow an iron to glide over the surface thereof without sticking or easily burning the underlying material. An underpad is provided as well comprising a foam pad (3) and a fiber pad (3a) which is sewn into the seams joining the top sheet to the heel, nose, and side portions, which underpad provides for flexibility for the user so as to speed up and simplify the ironing process.

When assembled all the segments which are sewn together with a known seam provide for a tight fit when placed on an Ironing Board. A binding (11) providing a path way for a draw string (15) is provided within the distal edges of all of the segments, and the box pleat (6a), so as to allow the draw string (15) to pass through each of the segments from adjacent the nose of the Ironing Board Cover and to return to that location. By locating the draw string at this location and by providing an arcuate portion (5a) to provide smooth drawing of the draw string (15) the user can more tightly fit the Ironing Board Cover to a Ironing Board as the draw string is smoothly wrapped at an arced position (5a) at the nose rather than at a squared position at the heel (6).

A convenient draw string locking mechanism is provided which is a spring biased fastener so that the draw string (15) may be pulled through openings (16c) and (16d) in the locking device (16) which is closed by a spring biased lock (16a) which presses against the draw string (15) as illustrated and thereby prevents it from loosening once it is tightened on the Ironing Board.

Therefore a unique Ironing Board Cover (10) is manufactured which when sewn together provides for a tapered structure which will fit well on an Ironing Board even when the draw string (15) is not tightened because of the tapered arcuate design and interfit of the segments (2), (4), (5), and (6) making up the Ironing Board Cover. By providing a skirt which is disposed when manufactured to already fit to the sides of an ironing board and the portions underneath the Ironing Board adjacent the sides of the Ironing Board, the Ironing Board Cover (10) is unique.

The box pleat (6a) provided with the heel segment (6) of the Ironing Board Cover (10) is different from for example a fan like pleat in that when assembled it allows the material to lie flat and not fan out or bunch up unlike previous structures in the prior art. It also provides a more attractive finish for the Ironing Board Cover (10) once installed. Further the draw string passes through the pleat, (6a) at binding portion (6b) which is heretofore unknown.

Figure 5:
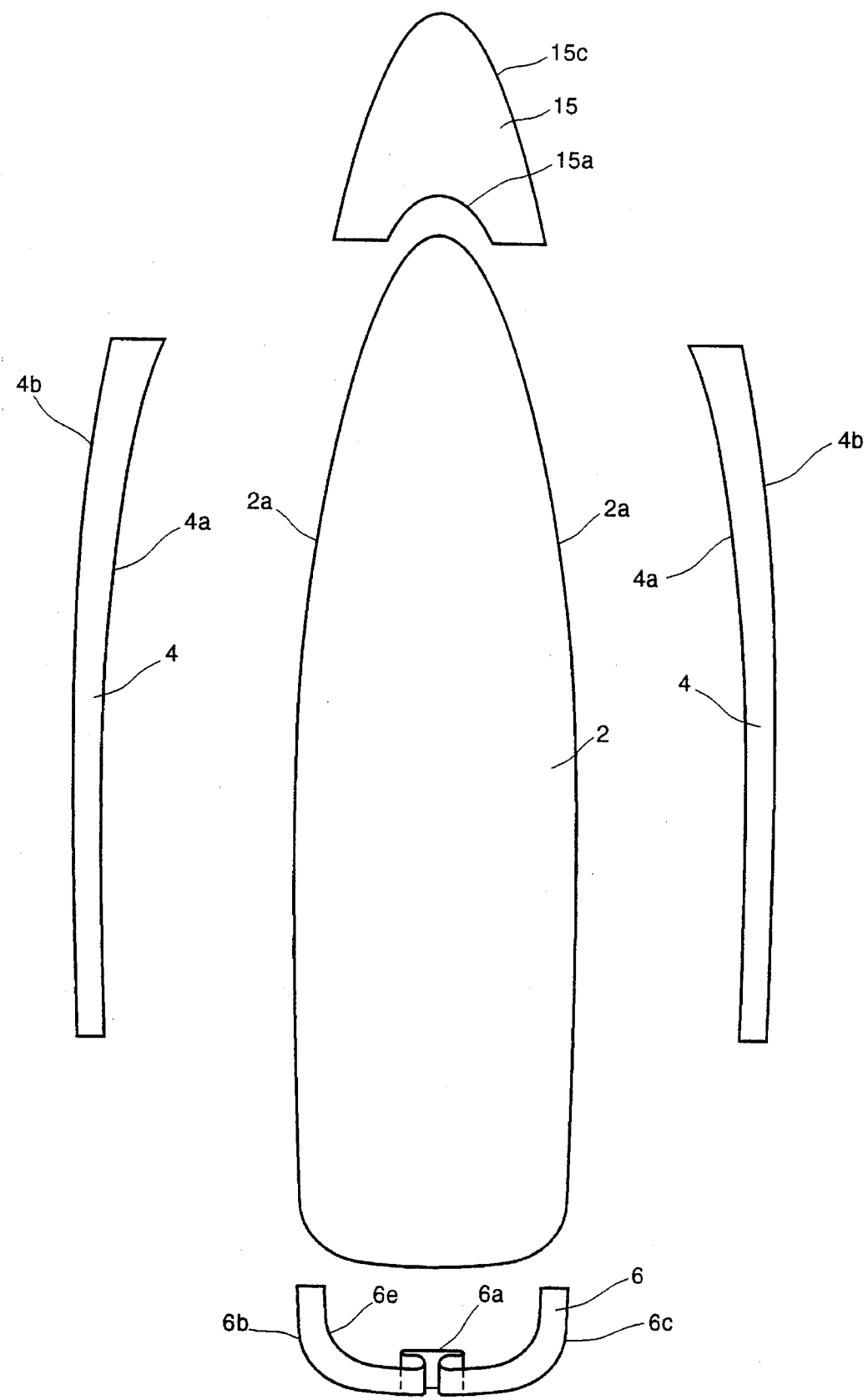
FIG. 5 is a schematic exploded view of the segments of the Ironing Board Cover that make up a finished product illustrated in a preferred embodiment of the invention.

Referring to FIG. 5 the ironing board cover (10) includes before assembly, a top sheet (2) a pad assembly (3 and 3a) a nose portion (5), two side segments (4), and a heel portion (6). The nose portion 5 includes an arcuate portion (5a) to provide a path for the binding (11) and ease of tightening of the draw string (15) at that location. In the manufactured embodiment the nose is 11³⁄₁₆ inches (28.416 cms) wide. The heel portion (6) includes a box pleat (6a) as illustrated which is 3 inches (7.62 cms) overall. The sides (6c) of the heel (6) are tapered outwardly away from the box pleat (6a) and toward the side segments (4). The segments (4) are 36 inches (91.44 cms) long and have arcuate portion (4b) provided proximate one side and arcuate positions (4a) provided proximate the other side. The portions (4b) are sewn as shown with the nose (5) and heel (6) as well as the top portion (2a) of the top sheet (2) and the edges of the foam and fiber pads (3 and 3a) with a ⅜ inch (0.9525 cms) threaded safety stitch. As well portions (6c) and (6d) of the heel portion (6) and arcuate portion (5b) of the nose portion (5) are likewise sewn together with the top sheet (2) and pads (3 and 3a) at this time. The surfaces (5a), (4a) and (6e) and box pleat (6b) are provided with a continuous 1¼ (3.175 cms) binding (11) sewn into these locations. A draw string (15) is provided passing through the binding (11) which maybe 132 inches (335.28 cms) long and made from polyester. The finished overall cover (10) is therefore 54¾ inches (139.065 cms) long and 15¾ inches (40.005 cms) wide when complete.

Therefore a unique Ironing Board Cover (10) has been provided which is engineered to cover not only the top of the ironing board but the sides thereof because of the assembly of the Ironing Board Cover (10) to cover the sides and the portions adjacent the sides of the underside of an ironing board.

As many changes can be made to the preferred embodiments of the invention with out departing from the scope thereof; it is considered that all matter contained herein be considered illustrative of the invention and not in a limiting sense.

The embodiments of the invention in which an exclusive property or privilege is claimed are as follows:

1. An ironing board cover for providing a surface upon which to iron, the ironing board cover comprising a front, a rear, two sides, a top and a bottom, said cover including a top sheet, a sewn in flexible pad, a nose segment adjacent the front of the cover, a heel segment adjacent the rear of the cover, and two side segments, said segments being attached to one another at seams, and said flexible pad being sewn into the bottom of the top sheet about the circumference of the top sheet; said nose segment, said side segments and said heel segment being tapered when formed so as to provide when joined with the top sheet a form fit ironing board cover, said heel segment and/or said nose segment including a box pleat for allowing the give of either the heel or the nose segment or both when installing the ironing board cover on an ironing board, wherein said box pleat and said heel, nose and side segments provide for a tight yet flexible fit of the ironing board cover on an ironing board and provides a user with a flexible surface upon which to iron, wherein said side segments, said heel segment, said nose segment, and any box pleat present, include a binding for a draw string integral therewith adjacent the inner distal edges of the segments when assembled with the top sheet, said binding for carrying a draw string and when present said draw string terminating at two ends adjacent the inner distal edge of the nose portion of the ironing board cover.

2. The ironing board cover of claim 1 wherein said cover is coated with a clear non-stick material.

3. The ironing board cover of claim 1 wherein said flexible pad includes an inner foam pad and an outer fiber pad.

4. The ironing board cover of claim 3 wherein said side segments are formed as arcuate segments to provide when assembled with the top sheet a form fit skirt substantially fitted to the form of the ironing board.

5. The ironing board cover of claim 4 wherein said nose and heel segments are formed as arcuate segments to provide when assembled with the top sheet a form fit skirt substantially fitted to the form of the ironing board.

6. The ironing board cover of claim 3 wherein said nose and heel segments are formed as arcuate segments to provide when assembled with the top sheet a form fit skirt substantially fitted to the form of the ironing board.

7. The ironing board cover of claim 1 wherein said side segments are formed as arcuate segments to provide when assembled with the top sheet a form fit skirt substantially fitted to the form of the ironing board.

8. The ironing board cover of claim 7 wherein said nose and heel segments are formed as arcuate segments to provide when assembled with the top sheet a form fit skirt substantially fitted to the form of the ironing board.

9. The ironing board cover of claim 1 wherein said nose and heel segments are formed as arcuate segments to provide when assembled with the top sheet a form fit skirt substantially fitted to the form of the ironing board.

10. The ironing board cover of claim 1 wherein said nose segment includes an arc portion adjacent the binding where the draw string is located to provide a smoother tensioning of the draw string.

11. The ironing board cover of claim 10 wherein said draw string has a quick locking device including a spring biased detent means which presses against the draw string when said draw sting is pulled to tighten said ironing board cover on said ironing board.

12. The ironing board cover of claim 11 wherein the spring biased detent means allows the draw string to pass through the locking device and thereafter when released pinches the draw string at an infinite number of positions thus allowing tightening of the draw string and securing of said ironing board cover on the ironing board.

13. The ironing board cover of claim 1 wherein said draw string has a quick locking device including a spring biased detent means which presses against the draw string when said draw sting is pulled to tighten said ironing board cover on said Ironing Board.

14. The ironing board cover of claim 13 wherein the spring biased detent means allows the draw string to pass through the locking device and thereafter when released pinches the draw string at an infinite number of positions thus allowing tightening of the draw string and securing of said ironing board cover on the ironing board.

15. An ironing board cover for providing a surface upon which to iron, the ironing board cover comprising a front, a rear, two sides, a top and a bottom, said cover including a top sheet, a sewn in flexible pad, a nose segment adjacent the front of the cover, a heel segment adjacent the rear of the cover, and two side segments, said segments being attached to one another at seams, and said flexible pad being sewn into the bottom of the top sheet about the circumference of the top sheet; said nose segment, said side segments and said heel segment being tapered when formed so as to provide when joined with the top sheet a form fit ironing board cover, said heel segment and/or said nose segment including a pleat for allowing the give of either the heel or the nose segment or both when installing the ironing board cover on an ironing board, wherein said pleat and said heel, nose and side segments provide for a tight yet flexible fit of the ironing board cover on an ironing board and provides a user with a flexible surface upon which to iron, wherein said side segments, said heel segment, said nose segment, and..any pleat present, include a binding for a draw string integral therewith adjacent the inner distal edges of the segments when assembled with the top sheet, said binding for carrying a draw string and when present said draw string terminating at two ends adjacent the inner distal edge of the nose portion of the ironing board cover.

* * * * *